H. E. McGOWAN & E. R. ELLSWORTH.
COMBINATION ELECTRIC SERVICE CUT-OUT AND METER PANEL.
APPLICATION FILED MAR. 9, 1907.
898,771.
Patented Sept. 15, 1908.
2 SHEETS—SHEET 1.
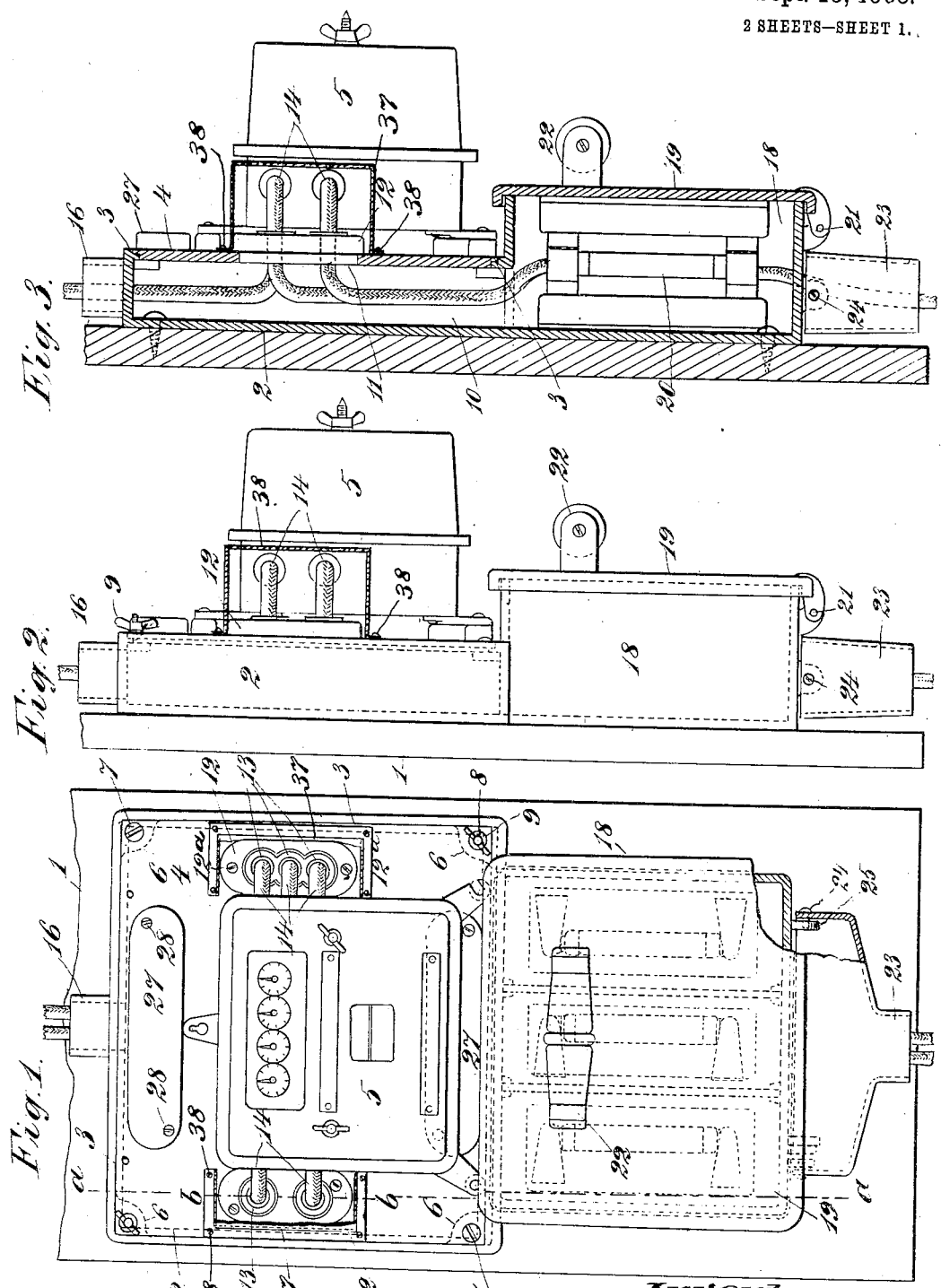

H. E. McGOWAN & E. R. ELLSWORTH.
COMBINATION ELECTRIC SERVICE CUT-OUT AND METER PANEL.
APPLICATION FILED MAR. 9, 1907.
898,771.
Patented Sept. 15, 1908.
2 SHEETS—SHEET 2.
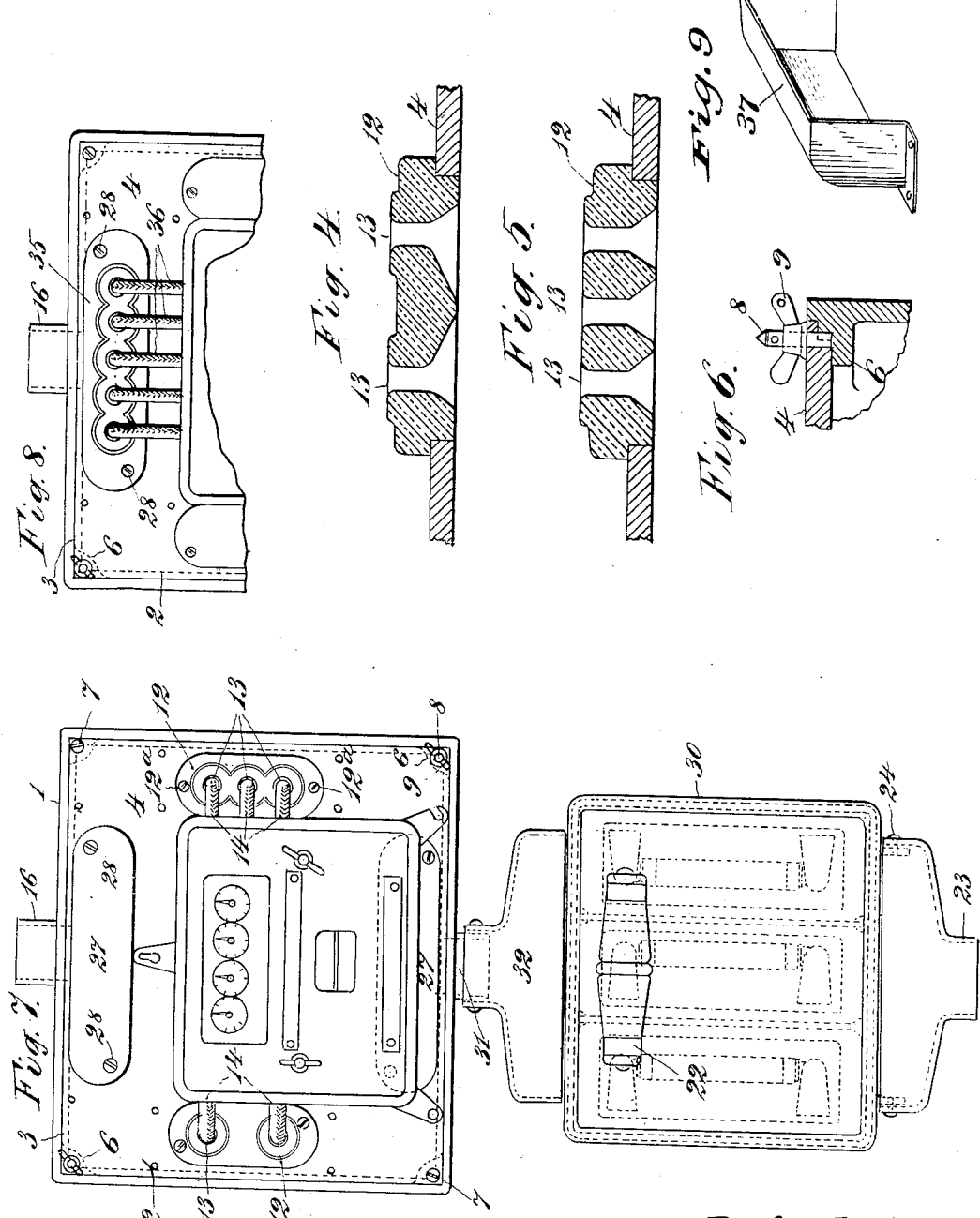

UNITED STATES PATENT OFFICE.

HENRY E. McGOWAN AND EDWIN R. ELLSWORTH, OF NEW YORK, N. Y.

COMBINATION ELECTRIC-SERVICE CUT-OUT AND METER-PANEL.

No. 898,771.      Specification of Letters Patent.      Patented Sept. 15, 1908.

Application filed March 9, 1907. Serial No. 361,443.

*To all whom it may concern:*

Be it known that we, HENRY E. McGOWAN and EDWIN R. ELLSWORTH, citizens of the United States, both residing in the borough of Brooklyn, county of Kings, and city and State of New York, have invented certain new and useful Improvements in Combination Electric-Service Cut-Outs and Meter-Panels, of which the following is a specification.

This invention relates to certain improvements in means for inclosing or protecting the electrical connections of meters, fuses, and similar devices, and has for its object to provide an inclosing casing or housing to receive the electrical conductors forming the meter or other connections in such a way as to prevent tampering therewith and also protecting them from mechanical injury and to lessen the liability of fires and other damage due to the defective insulation of said conductors.

The invention consists, in part, in a protective casing or housing wherein is produced a chamber or passage through which electrical conductors are adapted to be extended in such a manner as to be effectively inclosed and protected against tampering, mechanical injury and deterioration, said casing or housing having a front or face plate capable of movement in order to afford access to such inclosed conductors and adapted to support a meter or other equivalent device and through which the conductors are extended from the interior of the casing or housing for connection with such meter or equivalent device in a manner to afford a secure and effective connection or fastening to hold the front or face plate against opening movement upon said casing or housing.

Another part of the invention consists in a protective casing or housing comprising two portions, one of which has a chamber adapted to receive a fuse or other cut-out, and the other portion of which has a passage through which the electrical conductors are extended from said fuse or cut-out in such a manner as to be wholly inclosed and protected, said last-named casing portion being provided with a movable front or cover plate whereon is mounted a meter connected with such inclosed and protected conductors, these parts being so combined and arranged as to form the service connections for a building or the like, and being adapted to be set up ready for use and transported to such building, so that the service connections are thereby capable of being conveniently and economically installed without requiring the making of the meter and cut-out connections upon the premises.

Another part of the invention relates to a protective or inclosing casing having a chamber or passage wherein electrical conductors are adapted to be inclosed and protected, and provided with a front or cover plate whereon a meter or equivalent device is adapted to be mounted, the said front or cover plate being adjustably held upon the casing in such a manner as to permit of varying its position to accommodate meters of different types or styles, whereby the one type or style of casing is rendered adaptable for use in connection with meters of different styles or types.

The invention also contemplates certain novel features of the construction, and combinations and arrangements of the several parts of the improved protective housing or casing, whereby certain important advantages are attained, and the device is rendered simpler, cheaper and otherwise better adapted and more convenient for use, all as will be hereinafter fully set forth.

The novel features of the invention will be carefully defined in the claims.

In the accompanying drawings which illustrate our invention—Figure 1 is a face view of an inclosing or protective housing or casing embodying a preferred form of our invention; Fig. 2 is a side view of the device as shown in Fig. 1; Fig. 3 is a sectional view taken vertically through the casing or housing in the plane indicated by the line *a, a* in Fig. 1; Fig. 4 is an enlarged sectional detail view taken vertically through the upper part of the device in the plane indicated by the line *a, a,* in Fig. 1, and showing one form of the detachable insulating escutcheons carried by the casing or housing; Fig. 5 is a view similar to Fig. 4, but showing another form of the escutcheon for the casing or housing; Fig. 6 is a fragmentary detail view showing certain features of the means for sealing the casing or housing to prevent tampering with the electrical conductors therein; Fig. 7 is a face view, similar to Fig. 1, but showing a modified formation of the casing or housing embodying our improvements, and Fig. 8 is a fragmentary face view showing a modified arrangement of the insulating escutcheon comprised in our present invention.

Fig. 9 is a detached perspective view showing one of the shields or covers for the extended portions of the meter connections.

As shown in Figs. 1 to 6, 1 represents a suitable support, which may be a wall, meter board or other part, and 2 represents a hollow or chambered casing or housing herein shown as made in rectangular form adapted to be secured flush upon the support 1 by means of screws or like attaching means, and having around its front part, an encircling ledge or seat 3 whereon is adapted to be fitted the chamfered edge portion of a removable front plate 4, which when in place serves to close the front of the rectangular casing 2 and affords a support whereon may be detachably held a meter 5 or other similar device, the connections whereof are to be housed and protected within the casing 2.

The casing or housing 2 may be formed from metal or other suitable material, and at its four corners there are provided lugs 6, 6, extended beneath the removable front plate or cover 4. At diagonally opposite corners, screws 7, 7, are passed through the front plate or cover 4 and engaged on said lugs 6, 6, for holding said plate or cover in position, and at the remaining diagonally opposite corners of said front plate or cover, the lugs 6, 6, have outwardly extended screw studs 8, 8, passed through apertures in the cover 4, nuts 9, 9, being carried at their outer ends as seen in Fig. 6. The said studs 8, 8, and nuts 9, 9, are perforated to receive a seal in a well known way to prevent unauthorized removal of the cover or front plate. Where this arrangement of the parts is employed, the front or cover plate may be detached and completely removed from the casing or housing to afford unobstructed access thereto when desired.

The interior chamber or hollow 10 of the housing or casing 2 is adapted to receive and house the several conductors which form the terminal connections of the meter 5, and the front plate or cover 4 may be removed to afford free access to said terminals and also to the screws or other attaching means whereby the casing or housing is held to the support 1, but when the front plate or cover is sealed in position, the said conductors and attaching means will be covered and effectively protected against being tampered with. To afford access to the interior of the casing or housing, the front of cover plate 4 has apertures at its upper and lower parts over which plates 27, 27, of insulating or other material are detachably held by means of screws 28 or the like.

At opposite sides of the meter 5, the front plate or cover 4 has suitably formed openings 11, wherein are seated the reduced or shouldered parts of escutcheon plates 12, which are formed from porcelain or other suitable insulating substances and are detachably held to said front plate or cover 4 by means of screws 12$^a$ or the like at their opposite ends, and in the central parts of said insulating escutcheon plates 12, 12 are produced openings 13, 13 through which are to be passed the conductors 14, 14 leading to and from the meter 5.

At its lower part, the rectangular casing or housing 2 has a reduced, downwardly extended portion or extension 18 also adapted to fit flush upon the board or support 1 and to be secured thereto by means of screws or the like, and this extension 18 is also provided with a chamber or compartment, the upper part of which has communication with the upper chamber or compartment 10 of the body portion of the casing or housing 2, so that the feed conductors 14 leading to the meter 5 are adapted to be extended down within said chamber or compartment of extension 18, and connected with a fuse or cut-out 20 located therein. The extension 18 has a front or cover pate 19 hinged at its lower part, as seen at 21 in the drawings, and said cover plate is provided with a handle 22 whereby it may be conveniently opened and closed. The said front or cover plate is adapted to carry certain elements of the fuse or cut-out 20 in a well known way so that, by the opening of said front or cover plate, the supply circuit may be automatically interrupted during repair or inspection. By this arrangement, the supply conductors 14 leading to meter 5 are adapted to be connected at their upper ends to the meter at one side thereof, and to be extended thence through the apertured escutcheon 12 at one side of the front or cover plate 4 into the upper chamber or compartment 10 of the casing or housing, and thence the said supply conductors 14 are extended down within the lower chamber or compartment in extension 18 and are connected with the fuse or cut-out 20 therein, whereby it will be seen that when these connections are made, the front or cover plate 4 will be securely held against removal from the casing until the lower ends of said supply conductors shall have been disconnected from the fuse or cut-out, and tampering with the conductors within the casing will be thereby effectively prevented.

37, 37 represent hollow semi-cylindrical shields or covers of sheet metal or other suitable material, which are applied over the escutcheon plates 12 at opposite sides of the meter 5 to protect and inclose the meter connections where the same are extended outside of the front or cover plate 4 of the casing or housing. These shields or covers have flanges adapted to fit flush upon the front or cover plate 4, and are removably held in position by means of screws 38 or the like.

At the lower part of the extension 18 is provided a nipple 23, herein shown as being separately formed and detachably held upon the extension by means of screws 24 engaged in lugs 25 25 at opposite sides of an opening in the lower part of the extension 18, so that the service conductors may be passed up through said nipple 23 and through said opening at the lower part of extension 18 for connection with the cut-out as will be readily understood.

Upon the removal of the upper plate 27 from the front or cover plate 4, an apertured escutcheon plate 35, similar to the plates 12, may be applied at the opening at the top of the said front or cover plate 4, as clearly shown in Fig. 8, so as to adapt the device for use in connection with meters of types different from that shown in Figs. 1, 2 and 3, and since the said front or cover plate 4 is of symmetrical rectangular form, it will be seen that it is capable of being turned about, after its removal from the casing or housing, so as to be adapted for reapplication to said casing or housing in inverted position, so that such escutcheon plate 35 is thereupon positioned at the lower part of the casing or housing in such a manner as to adapt the device for use in connection with meters of other styles or types. Furthermore, such turning of the front or cover plate after its removal from the casing will reverse the position of the escutcheon plates 12, 12 at opposite sides of the meter, so as to render the device capable of use with still other styles and types of meters.

In the use of the improved inclosing and protecting means, the casing with its extension is adapted to be fitted or provided, before being brought to the premises at which it is to be installed for use, with the meter and cut-out, together with the inclosed conductors which connect such devices and seal the front or cover plate 4 in position. In this way a material economy and advantage is attained in that the conductors and devices at the service connections may be previously prepared and inspected at a central shop, and thence transported, ready for installation with a minimum of labor and inconvenience, to the various premises at which the service connections are desired to be effected.

From the above description of our invention it will be seen that the improved protecting and inclosing means constructed in accordance therewith is of an extremely simple and comparatively inexpensive nature, and is especially desirable for use by reason of the convenience with which it may be installed and of the security with which the inclosed conductors are protected against tampering and mechanical injury, and also by reason of the increased safety due to the complete housing of the conductors whereby the liability of damage from fire or defective insulation is lessened, and it will be also obvious that the improved protecting and inclosing means is susceptible of some modification without material departure from the principles and spirit of the invention and for this reason we do not desire to be understood as limiting ourselves to the precise form and arrangement of the several parts herein set forth in carrying out our invention in practice. For example, in some cases the construction shown in Fig. 7 may be adopted with good results. As shown in this view, the lower portion or extension 18 of the casing or housing is omitted and is replaced by a separately formed fuse box 30 of a well known construction, wherein the cut-out is mounted, a conduit being provided between the fuse box 30 and a nipple 31 integral with the lower part of the casing or housing 2 by means of a nipple 32 similar to the nipple 23 above described and which is extended from the top of the fuse box 30 to the nipple 31, for the effective inclosure and housing of the conductors extended from the chamber of the fuse box to that of casing 2.

It will also be obvious that in order to accommodate various forms and styles of meters and other devices, the casing may be given various sizes and forms dependent upon circumstances.

Having thus described our invention, what we claim and desire to secure by Letters Patent is—

1. Means for inclosing electric service connections comprising a casing having two compartments, one of which has a movable cover plate adapted to support a meter and apertured for the passage of the meter connections into such compartment, and the other compartment being adapted to contain a cut-out and having a movable cover plate, said compartments being in communication with each other to permit electrical conductors connected with the cut-out in one compartment to be extended in the other compartment and through the apertured cover plate thereof for connection with the meter to retain the parts in relation.

2. Means for inclosing electric service connections comprising a shallow flattened casing having a compartment and provided with a flat movable cover plate adapted to support a meter and apertured for the passage of the meter connections into such compartment, and an extension pendent below the said casing and provided with a compartment having a movable cover plate and adapted to contain a cut-out, the said compartments of the casing and extension being in communication with each other to permit electrical conductors connected with the cut-out in one compartment to be extended in the other compartment and through the apertured cover plate thereof for connection with the meter to retain the parts in relation.

3. Means for inclosing electric service connections comprising a casing having a compartment and provided with a removable cover plate extended across said compartment and adapted to support a meter, said cover plate being provided with apertures for the passage of meter connections into said compartment, and being of symmetrical form to permit it to be turned about, when removed from the casing, and re-applied thereto, to present its apertures at different sides of the meter, whereby the device is rendered capable of employment in connection with meters of different types.

4. Means for inclosing electric service connections comprising a casing having two compartments, one of which has a removable cover plate adapted to support a meter and provided with apertures for the passage of the meter connections into said compartment, and the other compartment being adapted to contain a cut-out and having a movable cover plate, said compartments being in communication with each other to permit electrical conductors connected with the cut-out in one compartment to be extended in the other compartment and through the apertures in the cover plate thereof for connection with the meter to retain the parts in relation, and said meter supporting cover plate being of symmetrical form to permit it to be turned about, when removed from the casing, and re-applied thereto, to present its apertures at different sides of the meter, whereby the device is rendered capable of employment in connection with meters of different types.

In witness whereof we have hereunto signed our names this 5th day of Mar. 1907, in the presence of two subscribing witnesses.

HENRY E. McGOWAN.
EDWIN R. ELLSWORTH.

Witnesses:
SOPHIA C. McGOWAN,
WILLIAM J. FIRTH.